US012261923B2

(12) United States Patent
Popelka et al.

(10) Patent No.: US 12,261,923 B2
(45) Date of Patent: *Mar. 25, 2025

(54) TECHNIQUES FOR CROSS PLATFORM COMMUNICATION PROCESS FLOW METRIC GENERATION AND DISPLAY

(71) Applicant: Salesforce, Inc., San Francisco, CA (US)

(72) Inventors: Aaron Popelka, San Francisco, CA (US); William Robert Jennings, II, Indianapolis, IN (US); Pranavkumar Janakbhai Parekh, Bothell, WA (US); Roy Raviv, Tel Aviv-Jaffa (IL)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,102

(22) Filed: Sep. 17, 2021

(65) Prior Publication Data

US 2023/0090607 A1 Mar. 23, 2023

(51) Int. Cl.
*H04L 67/62* (2022.01)
*G06F 16/2455* (2019.01)
*G06F 16/248* (2019.01)

(52) U.S. Cl.
CPC ........ *H04L 67/62* (2022.05); *G06F 16/24565* (2019.01); *G06F 16/248* (2019.01)

(58) Field of Classification Search
CPC ... H04L 67/62; G06F 16/24565; G06F 16/248
See application file for complete search history.

(56) References Cited

U.S. PATENT DOCUMENTS

| 8,666,961 | B1 * | 3/2014 | Qureshi | G06F 16/24 |
| | | | | 707/769 |
| 10,528,576 | B1 * | 1/2020 | Wei | G06F 16/9535 |
| 11,392,605 | B1 * | 7/2022 | Baskaran | G06F 16/24568 |
| 2011/0106829 | A1 * | 5/2011 | Pradhan | G06Q 30/0269 |
| | | | | 707/765 |
| 2013/0187926 | A1 * | 7/2013 | Silverstein | G06F 16/116 |
| | | | | 345/440 |
| 2017/0052652 | A1 * | 2/2017 | Denton | G06Q 50/01 |
| 2019/0163842 | A1 * | 5/2019 | Pal | G06F 16/248 |

(Continued)

*Primary Examiner* — Joseph L Greene
(74) *Attorney, Agent, or Firm* — Holland & Hart LLP

(57) ABSTRACT

A method that includes receiving a first request for a data object associated with a communication process flow that controls electronic communications between a tenant and a set of users corresponding to the tenant. The first request may include a set of querying parameters and a set of triggering parameters. The method may further include querying, based on the set of querying parameters, a communication process flow management service for data associated with the communication process flow. The method may further include generating, based on the querying, the data object that includes the data associated with the communication process flow. The method may further include transmitting, to a communication platform in accordance with the set of triggering parameters, a second request that comprises the data object. The second request may cause posting of an entry of the data object into a communication channel of the communication platform.

20 Claims, 11 Drawing Sheets

(56) References Cited

U.S. PATENT DOCUMENTS

| | | | |
|---|---|---|---|
| 2020/0134497 A1* | 4/2020 | Salomon | G06F 16/9024 |
| 2020/0336590 A1* | 10/2020 | Yan | H04L 61/4594 |
| 2020/0364223 A1* | 11/2020 | Pal | G06F 9/5016 |
| 2021/0110328 A1* | 4/2021 | Hsiao | G06F 16/1734 |
| 2022/0043811 A1* | 2/2022 | Salvat Lozano | H04L 41/5009 |
| 2022/0156268 A1* | 5/2022 | Fernig | G06F 16/248 |

* cited by examiner

TECHNIQUES FOR CROSS PLATFORM COMMUNICATION PROCESS FLOW METRIC GENERATION AND DISPLAY

FIELD OF TECHNOLOGY

The present disclosure relates generally to database systems and data processing, and more specifically to techniques for cross-platform communication process flow metric generation and display.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users (e.g., subscribers). Data analysis systems may analyze the data associated with communication process flows to identify and surface communication metrics (e.g. open rates, click rates). In addition, a communication platform (e.g., separate from the cloud platform) may be used for internal communications related to cloud platform functionality. However, because the communication platform and the cloud platform may be implemented in (e.g., supported by) separate computing systems, some features of the communication process flow management system may be incompatible with the communication platform, which may result in workflow inefficiencies and decreased user satisfaction.

DETAILED DESCRIPTION

Figure 1:
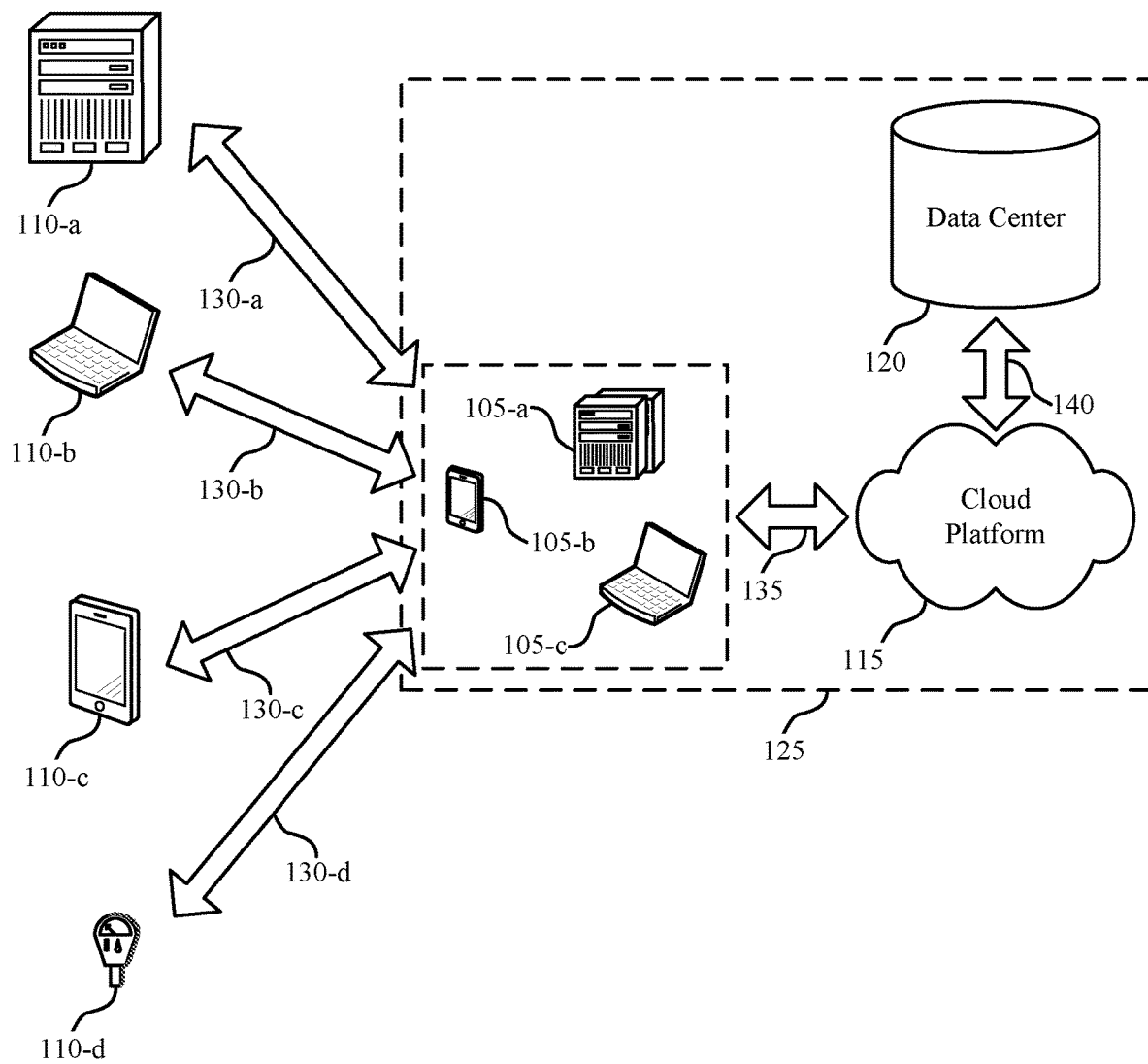
FIG. 1 illustrates an example of a data processing system that supports techniques for cross-platform communication process flow metric generation and display in accordance with aspects of the present disclosure.

Techniques described herein support cross-platform compatibility between a communication process flow management service and a communication platform. A communication process flow management service may support creation, configuration, management, and deployment of a communication process flow that manages communications between a set of users and a tenant or organization. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) according to a communication process flow. The communication process flow may include various actions and message configurations, and transmission of various communications may be dependent on user attributes and user web behavior, among other parameters.

Administrative users or employees associated with the tenant may use various services to track and monitor communication metrics associated with a communication process flow. For example, some services may provide statistics, such as open rate, click rate, unsubscribe rate, and the like, associated with one or more electronic communications controlled by a communication process flow. These statistics or communication metrics may be used to manually or automatically adjust aspects of the communication process flow. For example, these communication metrics may be used to support changing of content items (e.g., subject lines, images), communication frequencies, or transmission times, among other examples. The same or other services may also be used to detect anomalies associated with a communication process flow. For example, if the service detects that an open rate drops below an expected open rate, an alert may be surfaced to one or more administrative users. Thus, various aspects of the present disclosure may support communication process flow management and optimization.

In some cases, administrative users or employees associated with the tenant (e.g., a marketing team) may communicate, plan, and monitor aspects of a communication process flow using a communication platform. For example, the communication platform may support communication channels that are organized by topic, and team members may use these communication channels (e.g., chat room) to make decisions regarding a communication process flow. However, because the communication platform may be separate from the communication process flow management service, data associated with the communication process flow (e.g., communication metrics, events, anomalies) may be confined to computing systems that support the communication process flow management service. In some cases, users may use this data to determine whether to stop, pause, or modify aspects of a communication process flow. However, because these actions may be confined to the communication process flow management service, users may be unable to perform such actions from within the communication platform.

Techniques described herein support cross-platform compatibility between a communication process flow management service and a communication platform. The techniques described herein may support posting of various communication metrics, events, or data objects associated with a communication process flow into the communication platform. Likewise, the techniques described herein may enable users to interact with the communication process flow management service from within the communication platform. The described techniques may support improved workflow efficiency, reduced communication resource overhead, and higher user satisfaction, among other benefits.

Aspects of the present disclosure may provide for configuring a data services platform to generate a data object (e.g., a chart, graph, or visualization) associated with a communication process flow based on data from the communication process flow management service. Accordingly, the data services platform may post or otherwise display an indication of the data object within a communication channel of the communication platform. As an example, a user associated with a tenant of a multi-tenant system may transmit a first request for a data object associated with a communication process flow. Specifically, the user may transmit the first request to the data services platform via a user interface (UI) associated with the data services platform. The first request may include a set of querying parameters associated with the communication process flow and a set of triggering parameters associated with the data object.

Upon receiving the first request or satisfaction of the set of triggering parameters, the data services platform may query the communication process flow management service for data associated with the communication process flow. After receiving the data from the communication process flow management service, the data services platform may generate the data object based on the received data. Accordingly, the data services platform may transmit a second request to the communication platform. The second request may include the data object (e.g., a JavaScript object notation (JSON) object) or an indication of the data object (e.g., an image of the data object, a link to the data object). The second request may be configured to cause posting of the data object into a communication channel of the communication platform.

In some examples, the first request (e.g., from the user) may specify a scheduled time for posting the data object into the communication channel or a threshold associated with posting the data object into the communication channel. Accordingly, the data services platform may transmit the second request (e.g., to the communication platform) based on the set of triggering parameters. The set of triggering parameters may also specify a frequency for generating the data object or a frequency for posting the data object into the communication channel. In some examples, the set of querying parameters may include a time period for the communication process flow, a set of communication metrics for inclusion in the data object, or a set of display parameters for generation of the data object. Accordingly, the data services platform may generate the data object based on the set of querying parameters. Integrating the data services platform with the communication process flow management service and the communication platform in accordance with the described techniques may provide for improved workflow efficiency, greater cross-platform compatibility, and higher user satisfaction, among other benefits.

Aspects of the disclosure are initially described in the context of an environment supporting an on-demand database service. Aspects of the disclosure are illustrated by and described with reference to data processing systems and process flows. Aspects of the disclosure are further illustrated by and described with reference to apparatus diagrams, system diagrams, and flowcharts that relate to techniques for cross-platform communication process flow metric generation and display.

FIG. 1 illustrates an example of a data processing system 100 for cloud computing that supports techniques for cross-platform communication process flow metric generation and display in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 or the subsystem 125 may support a communication process flow management service, which may be used to configure a communication process flow. As described herein, a communication process flow may control electronic communications (e.g., emails, messages, advertisements) between a tenant (e.g., a cloud client 105) of a multi-tenant system and a set of users (e.g., contacts 110) associated with the tenant. The communication process flow may include various actions that are used to manage these electronic communications. For example, the communication process flow may include emails, decision splits, wait periods, and the like. In addition, the communication process flow may include different routes (e.g., sets of actions) that are configured via the communication process flow management service. Whether a user receives messages via a specific route may depend on attributes or behaviors of the user (e.g., interests, activity patterns, demographic information). These attributes may be stored in association with user identifiers at the data center 120.

Communication process flows may be configured by teams of administrators or users associated with the tenant (e.g., employees of an organization corresponding to the tenant). For example, these users may perform various activities related to configuring, reviewing, activating, and monitoring communication process flows using the communication process flow management service. In some cases, these users may discuss various aspects (e.g., performance, implementation) of a communication process flow via a communication platform that is separate from one or both of the cloud platform 115 or the subsystem 125 supporting the communication process flow and the communication process flow management service. That is, the communication process flow management service and the communication platform may be supported by different computing systems or cloud platforms. The communication platform may enable users to exchange messages in various chat rooms or communication channels that may be specific to a project, team, topic, or the like.

However, because the communication platform is external to the communication process flow management service, some aspects of the communication process flow management service may be incompatible with the communication platform. For example, data associated with an active communication process flow (e.g. a communication process flow managing ongoing communications) may be inaccessible from the communication platform. That is, users may be unable to access or otherwise interact with data from the communication process flow management service in the communication platform without manually entering (e.g., posting) the data into the communication platform. Further, if users of the communication platform determine to interact with or modify the communication process flow (e.g., by activating, pausing, or otherwise updating the communication process flow), these users may be unable to perform such interactions without manually navigating to the communication process flow management service. Thus, incompatibilities between the communication process flow management service and the communication platform may result in workflow inefficiencies and decreased user satisfaction. Additionally, because a user may be constrained to interacting with a communication process flow within the communication process flow management service, the communication process flow may utilize significant processing and communication resources by transmitting electronic communications before a user is able to interact with the communication process flow.

Techniques described herein may support cross-platform interaction and data access between a communication process flow management service supported by the cloud platform 115 and a communication platform, also referred to as a communication platform. In some cases, the communication process flow management service and the communication platform may be linked for intercommunication and interaction. The communication process flow management service may periodically, or in response to various conditions, post communication metrics associated with a communication process flow into one or more communication channels of the communication platform. The communication process flow management service may also post content (e.g., logs, updates, events, or data objects) associated with the communication process flow into one or more communication channels of the communication platform. This content may include textual elements (e.g., messages), visual elements (e.g., charts, graphs, diagrams), or a combination thereof. Additionally, a user may interact with the communication process flow management service directly from the communication platform. These interactions may be performed in response to the communication process flow management service posting the content into the communication platform.

Aspects of the present disclosure may provide for configuring a data services platform to generate a data object (e.g., a chart, graph, or visualization) associated with a communication process flow based on data from the communication process flow management service. Accordingly, the data services platform may post or otherwise display an indication of the data object within a communication channel of the communication platform. As an example, a user associated with a tenant of a multi-tenant system may transmit a first request for a data object associated with a communication process flow. Specifically, the user may transmit the first request to the data services platform via a UI associated with the data services platform. The first request may include a set of querying parameters associated with the communication process flow and a set of triggering parameters associated with the data object.

Upon receiving the first request, the data services platform may query the communication process flow management service for data associated with the communication process flow. After receiving the data from the communication process flow management service, the data services platform may generate the data object based on the received data. Accordingly, the data services platform may transmit a second request to the communication platform. The second request may include the data object (e.g., a JSON object) or an indication of the data object (e.g., an image of the data object, a link to the data object). The second request may be configured to cause posting of the data object into a communication channel of the communication platform.

In some examples, the first request (e.g., from the user) may specify a scheduled time for posting the data object into the communication channel or a threshold associated with posting the data object into the communication channel. Accordingly, the data services platform may transmit the second request (e.g., to the communication platform) based on the set of triggering parameters. The set of triggering parameters may also specify a threshold for generating the data object or a frequency for posting the data object into the communication channel. In some examples, the set of querying parameters may include a time period for the communication process flow, a set of communication metrics for inclusion in the data object, or a set of display parameters for generation of the data object. Accordingly, the data services platform may generate the data object based on the set of querying parameters. Integrating the data services platform with the communication process flow management service and the communication platform in accordance with the described techniques may provide for improved workflow efficiency, greater cross-platform compatibility, and higher user satisfaction, among other benefits.

Cross-platform interaction between the communication process flow management service, the communication platform, and the data services platform may also support improved workflow efficiencies and reduced processing overhead by reducing extraneous communications and data access requests. For example, the described techniques may enable users to access data associated with a communication process flow directly from the communication platform, which may result in fewer data access requests at the communication platform. Additionally, because the techniques described herein may enable users to interact with communication process flows directly from the communication platform, the described techniques may provide for lower communication resource overhead. The described techniques may also support improved workflow efficiency by reducing a number of times that a user switches between various platforms to perform various tasks associated with a communication process flow.

It should be appreciated by a person skilled in the art that one or more aspects of the disclosure may be implemented to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
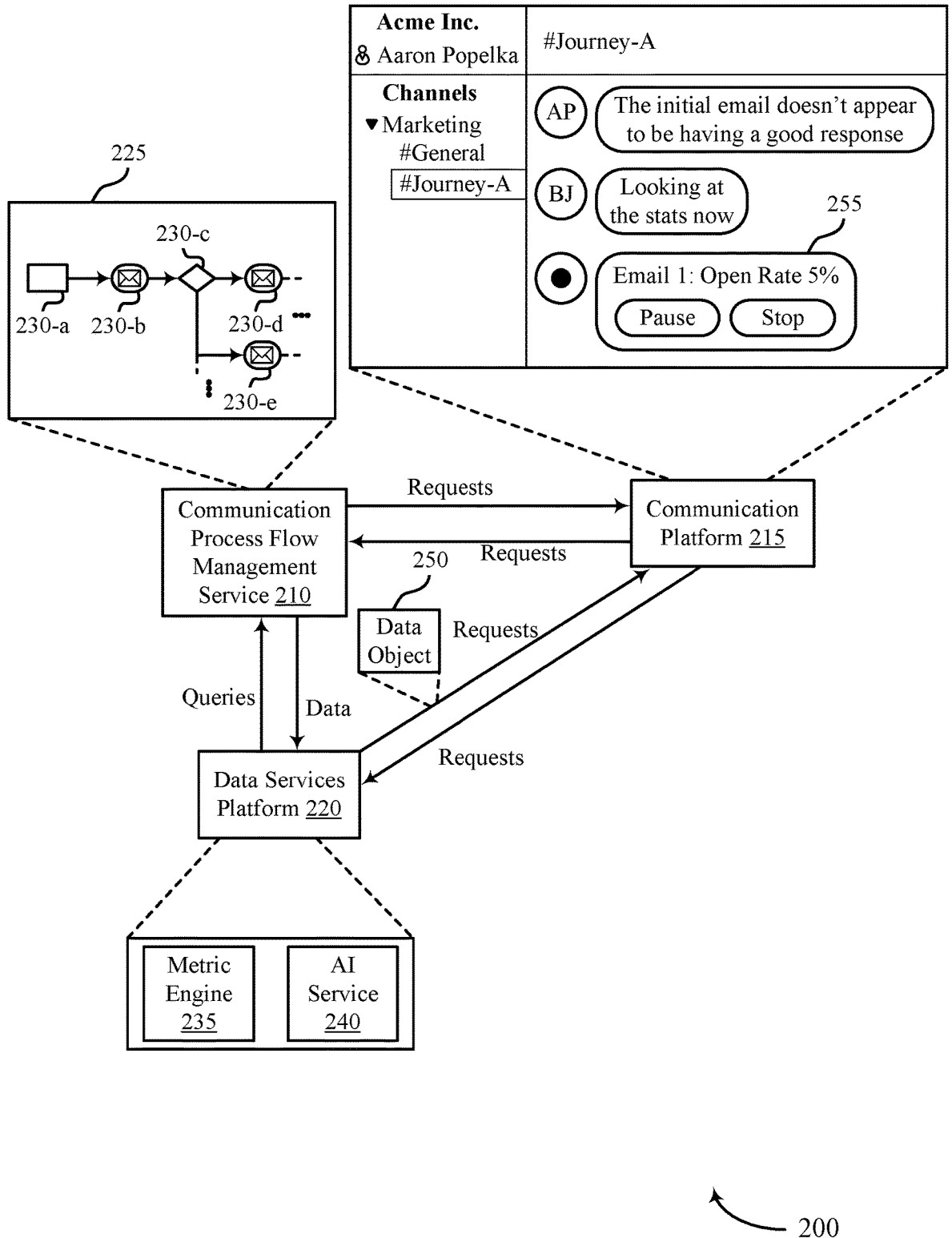
FIG. 2 illustrates an example of a computing architecture that supports techniques for cross-platform communication process flow metric generation and display in accordance with aspects of the present disclosure.

FIG. 2 illustrates an example of a computing architecture 200 that supports techniques for cross-platform communication process flow metric generation and display in accordance with aspects of the present disclosure. The computing architecture 200 may implement or be implemented by aspects of the data processing system 100. For example, the computing architecture 200 may include a communication process flow management service 210, a communication platform 215, and a data services platform 220, each of which may be implemented by aspects of a cloud platform 115 or a subsystem 125 described with reference to FIG. 1. In some examples, the systems or servers supporting the communication platform 215 may be include computing systems that are logically or physically separated from systems or servers supporting one or both of the communication process flow management service 210 or the data services platform 220.

As described herein, the communication process flow management service 210 may support creation, configuration, and implementation of various communication process flows (e.g., a communication process flow 225) that control electronic communications between a tenant and a set of users associated with the tenant. For example, users associated with the tenant may use the communication process flow management service 210 to perform actions (e.g., actions 230) that include processor-executable instructions for management of electronic communications. For example, an action 230-a may include instructions that, when executed by a processor, selects users (e.g., customers) for the communication process flow 225. That is, the action 230-a may define a rule for determining whether users are to receive electronic communications in accordance with the communication process flow 225. The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 225. Users that do not satisfy this criteria may not receive electronic communications in accordance with the communication process flow 225.

Other actions 230 may define message transmission schemes, decision splits, and other related processes. For example, each user that satisfies a rule defined by the action 230-a may receive an email according to an action 230-b. The action 230-b may include specific content that is to be transmitted to the users (e.g., via email). Similarly, an action 230-c may define a decision split between users. For example, users that have opened an email corresponding to the action 230-b may be routed to an action 230-d, while users that have not opened the email corresponding to the action 230-b may be routed to an action 230-e. Additionally or alternatively, the action 230-c (e.g., a decision split) may utilize other attributes and behaviors to route users through the communication process flow 225.

The data services platform 220 may support various services that monitor, aggregate, and display communication metrics associated with communication process flows at the communication process flow management service 210. For example, the data services platform 220 may include a metric engine 235 that generates and displays engagement metrics (e.g., open rate, click rate, unsubscribe rate, send rate) associated with one or more electronic communications of the communication process flows supported by the communication process flow management service 210. These engagement metrics may include textual elements (e.g., messages) and visual elements (e.g., charts, graphs, diagrams).

The data services platform 220 may also support an artificial intelligence (AI) service 240 that analyzes communication data associated with communication process flows supported by the communication process flow management service 210. In some cases, the AI service 240 may identify (e.g., using AI techniques or algorithms) anomalies associated with the electronic communications. For example, if a communication metric (e.g., open rate) for the communication process flow 225 falls below an expected threshold, the AI service 240 may generate an alert. The metric engine 235 and the AI service 240 may be implemented as a single service (e.g., supported by the same server) or different services (e.g., supported by different servers).

The data services platform 220 may transmit queries or requests to the communication process flow management service 210, and may receive data associated with the communication process flow 225 in response to the queries or requests. The data services platform 220 may use the data received from the communication process flow management service 210 to generate communication metrics and detect anomalies related to the communication process flow 225. That is, the data services platform 220 may receive communication data from the communication process flow management service 210 to support metric generation and anomaly detection for the communication process flow 225.

The communication platform 215 may support a chat or instant messaging service used for various business functionalities. For example, teams associated with a tenant may use the communication platform 215 to manage communication process flows supported by the communication process flow management service 210. These teams may use the communication platform 215 to discuss aspects of the communication process flow 225 or to make decisions regarding the communication process flow 225. For example, users of the communication platform may decide to reconfigure or interact with the communication process flow 225 based on data from the data services platform 220. However, because the communication process flow management service 210 and the communication platform 215 may be implemented in separate computing systems, some features of the communication process flow management service 210 may be incompatible with the communication platform 215. Thus, if a decision regarding the communication process flow 225 is made by a user within the communication platform 215, the user may be unable to change or interact with the communication process flow 225 from the communication platform 215. Further, because the data services platform 220 and the communication platform 215 may be supported by separate computing systems, a user may be unable to post or otherwise display data (e.g., communication metrics, anomalies) associated with the communication process flow 225 in a communication channel of the communication platform 215 without manually inputting the data into the communication channel.

Techniques described herein may support improved cross-platform compatibility between the communication process flow management service 210, the communication platform 215, and the data services platform 220. To provide such improvements, the communication platform 215 may be configured with endpoints (e.g., a webhook or application) that enable one or both of the communication process flow management service 210 or the data services platform 220 to transmit requests to the communication platform 215. These requests may include data objects (e.g., a data object 250) that are ingestible by the communication platform 215 for posting into one or more communication channels of the communication platform 215. The data object 250 may include data regarding events (e.g., communication metrics, anomalies) detected or generated at the data services platform (e.g., the metric engine 235 or the AI service 240).

Further, the communication platform 215 may be configured to transmit requests to one or both of the communication process flow management service 210 or the data services platform 220. For example, a user may enter a command or activate a UI component within the communication platform 215, and may interact with the UI component to request additional data associated with the communication process flow 225 (e.g., refined communication metrics or additional data associated with an anomaly). In some cases, the UI component may enable a user to interact with the communication process flow 225 directly from the communication platform 215. For example, a user may pause or stop the communication process flow 225 in response to data being posted within the communication platform 215.

To support improved cross-platform compatibility, the various services described with reference to the computing architecture 200 may be configured with endpoints and authorizations. For example, a user may manually enter an endpoint associated with a workspace (e.g., collection of communication channels) or a specific communication channel of the communication platform into the communication process flow management service 210 or the data services platform 220. In some cases, a user may download an application that enables the user to interact with the communication platform 215. The application may include various authentication flows and setup flows to configure endpoints for the various services. When setting up the application, the user may log into an account for the communication process flow management service 210 to authenticate the user and to set up respective endpoints. After configuring the respective endpoints, these endpoints may be used to transmit requests for data objects (e.g., for posting into the communication platform). The entries (e.g., an entry 255) may be posted by a participant to the communication channel. In some cases, the participant may be an example of a bot or an AI that is configured to post into the communication channel.

In the example of FIG. 2, the data services platform 220 may be configured to generate the data object 250 (e.g., a chart, graph, or visualization) associated with the communication process flow 225 based on data received from the communication process flow management service 210. Accordingly, the data services platform 220 may post or otherwise display an indication of the data object (e.g., the entry 255) within a communication channel of the communication platform. As an example, a user associated with a tenant of a multi-tenant system may transmit a first request for the data object 250 associated with the communication process flow 225. Specifically, the user may transmit the first request to the data services platform 220 via a UI associated with the data services platform 220. The first request may include a set of querying parameters associated with the communication process flow 225 and a set of triggering parameters associated with the data object 250.

Upon receiving the first request, the data services platform 220 may query the communication process flow management service 210 for data associated with the communication process flow 225. After receiving the data from the communication process flow management service 210, the data services platform 220 may generate the data object 250 based on the received data. Accordingly, the data services platform 220 may transmit a second request to the communication platform 215. The second request may include the data object 250 (e.g., a JavaScript object notation (JSON) object) or an indication of the data object (e.g., an image of the data object, a link to the data object). The second request may be configured to cause posting of the entry 255 (e.g., an indication of the data object 250) into a communication channel of the communication platform 215.

In some examples, the first request (e.g., from the user) may specify a scheduled time for posting the data object 250 into the communication channel or a threshold associated with posting the data object 250 into the communication channel. Accordingly, the data services platform 220 may transmit the second request (e.g., to the communication platform 215) based on the set of triggering parameters. The set of triggering parameters may also specify a frequency for generating the data object 250 or a frequency for posting the data object 250 into the communication channel. In some examples, the set of querying parameters may include a time period for the communication process flow 225 (e.g., a month to month reporting period), a set of communication metrics for inclusion in the data object 250, or a set of display parameters for generation of the data object 250. Accordingly, the data services platform 220 may generate the data object 250 based on the set of querying parameters. Integrating the data services platform 220 with the communication process flow management service 210 and the communication platform 215 in accordance with the described techniques may provide for improved workflow efficiency, greater cross-platform compatibility, and higher user satisfaction, among other benefits.

As described herein, the cross-platform capability techniques also support user interaction with the communication process flow. Thus, in response to posting of the entry 255 into the communication platform 215, the user may activate a UI component to interact with the communication process flow. For example, in response to communication metrics posted to the communication platform 215 by the metric engine 235 or data services platform 220, a user may activate a button to cause the communication process flow 225 execution to be paused. Thus, if a user determines that a metric is usually low, the user may pause execution of the communication process flow, thereby reducing wasteful communication resources. Other communication process flow 225 interaction techniques from the communication platform 215 are contemplated within the scope of the present disclosure.

Figure 3:
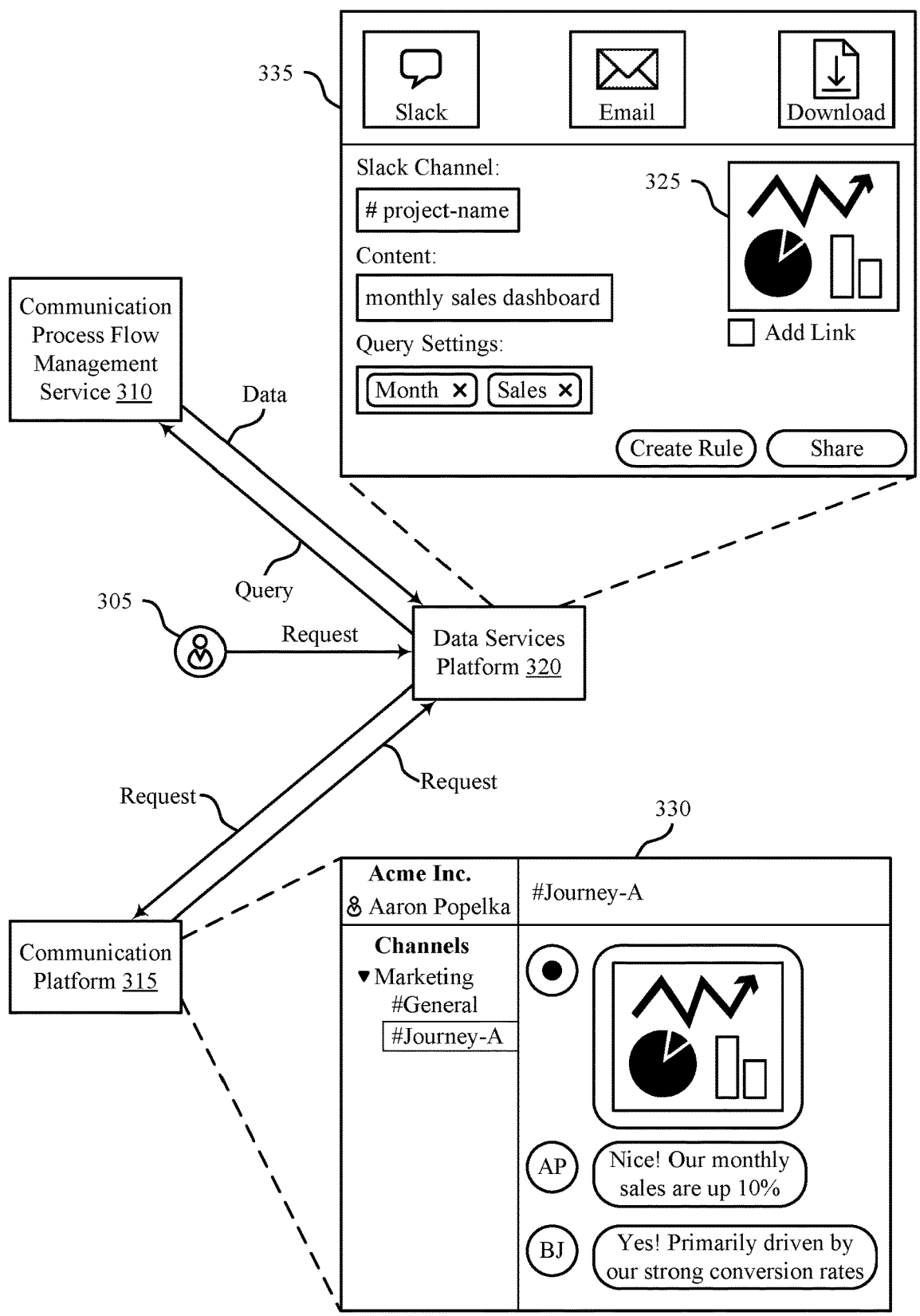
FIG. 3 illustrates an example of a data processing system that supports techniques for cross-platform communication process flow metric generation and display in accordance with aspects of the present disclosure.

FIG. 3 illustrates an example of a data processing system 300 that supports techniques for cross-platform communication process flow metric generation and display in accordance with aspects of the present disclosure. The data processing system 300 may implement or be implemented by aspects of the data processing system 100 or the computing architecture 200. For example, the data processing system 300 may include a communication process flow management service 310, a communication platform 315, and a data services platform 320, which may be examples of corresponding services and platforms described with reference to FIGS. 1 and 2. The data processing system 300 may also include a user 305, which may be an example of a cloud client 105 (e.g., a tenant) described with reference to FIG. 1. The data processing system 300 may support techniques for improved cross-platform compatibility between the communication process flow management service 310, the communication platform 315, and the data services platform 320.

In the example of FIG. 3, the user 305 may transmit a first request for a data object 325 associated with a communication process flow (e.g., a communication process flow 225 described with reference to FIG. 2). The user 305 may transmit the first request via a UI 335 associated with the data services platform 320 or a UI 330 associated with the communication platform 315. The first request may include a set of querying parameters associated with the communication process flow and a set of triggering parameters associated with the data object 325. The set of querying parameters may specify a time duration associated with the communication process flow or a set of communication metrics related to the communication process flow, among other examples. The set of triggering parameters may specify one or more of a threshold, a frequency, or a scheduled time for posting the data object 325 into a communication channel of the communication platform 315.

Upon receiving the first request or upon satisfaction of a trigger parameter, the data services platform 320 may transmit a query to the communication process flow management service 310 in accordance with the set of querying parameters. For example, the data services platform 320 may query the communication process flow management service 310 for information (e.g., data related to the communication process flow) that corresponds to a time duration specified by the set of querying parameters. Accordingly, the communication process flow management service 310 may transmit data associated with the communication process flow to the data services platform 320. After acquiring the data associated with the communication process flow from the communication process flow management service 310, the data services platform 320 may generate the data object 325 (e.g., a data object 250 described with reference to FIG. 2). The data object 325 may include a chart, a graph, or a visualization of the acquired data. For example, the data object 325 may illustrate various communication metrics related to the communication process flow.

The data services platform 320 may transmit a second request to the communication platform 315 in accordance with the set of triggering parameters. For example, the data services platform 320 may transmit the second request based on the communication process flow satisfying a threshold specified by the set of triggering parameters. Additionally or alternatively, the data services platform 320 may transmit the second request based on a scheduled time or frequency (e.g., every week, every other day) specified by the set of triggering parameters. The second request may trigger posting of an entry into a communication channel of the communication platform 315. The entry may include an indication of the data object, such as an image of the data object 325 or a link to the data object (e.g., a universal resource locator (URL) corresponding to the data services platform 320). Thus, the data object and thereby the entry may include various communication metrics (e.g., open rate, click rate, unsubscribe rate, or a combination) associated with the communication process flow. The metrics may correspond to one communication or action associated with the communication process flow or a set of communications or actions corresponding to the communication process flow. The data object and entry may include images of charts or graphs displaying these metrics and a link to the data services platform 320 that may be used to access more details regarding the metrics.

In some examples, the user 305 may transmit a third request for additional data related to the communication process flow. For example, the user 305 may request a different data object associated with a communication process flow or different communication metrics for the communication process flow. Thus, the third request may also include indications of different querying parameters (e.g., refined time periods) for identification of the communication metrics. Upon receiving the third request, the data services platform 320 may transmit an additional query to the communication process flow management service 310 to retrieve the requested data. Accordingly, the data services platform 320 may transmit a fourth request to the communication platform 315, which may trigger posting of a second entry into the communication channel. The second entry may include an indication of the additional data pertaining to the third request. In some examples, if the entry includes a link to the data object 325 and the user 305 interacts with (e.g., clicks) the link, the data services platform 320 may trigger display of the UI 335 (e.g., within a web browser) such that the user 305 can directly interact with the communication process flow via the UI 335. Alternatively, the user 305 may adjust or update a configuration of the communication process flow directly from the communication platform 315 (e.g., using the UI 330).

The data processing system 300 may support techniques for improved cross-platform compatibility between the communication process flow management service 310, the communication platform 315, and the data services platform 320. For example, the data services platform 320 may be configured to generate a data object associated with a communication process flow using data acquired from the communication process flow management service 310. The data services platform 320 may also be configured to transmit a request that causes posting (e.g., triggers display) of the data object in a communication channel of the communication platform 315. As such, the data services platform 320 may enable users of the communication platform 315 to interact with data from the communication process flow management service 310 via the communication platform 315, which may result in improved workflow efficiency, greater cross-platform compatibility, and lower resource overhead, among other benefits.

Figure 4:
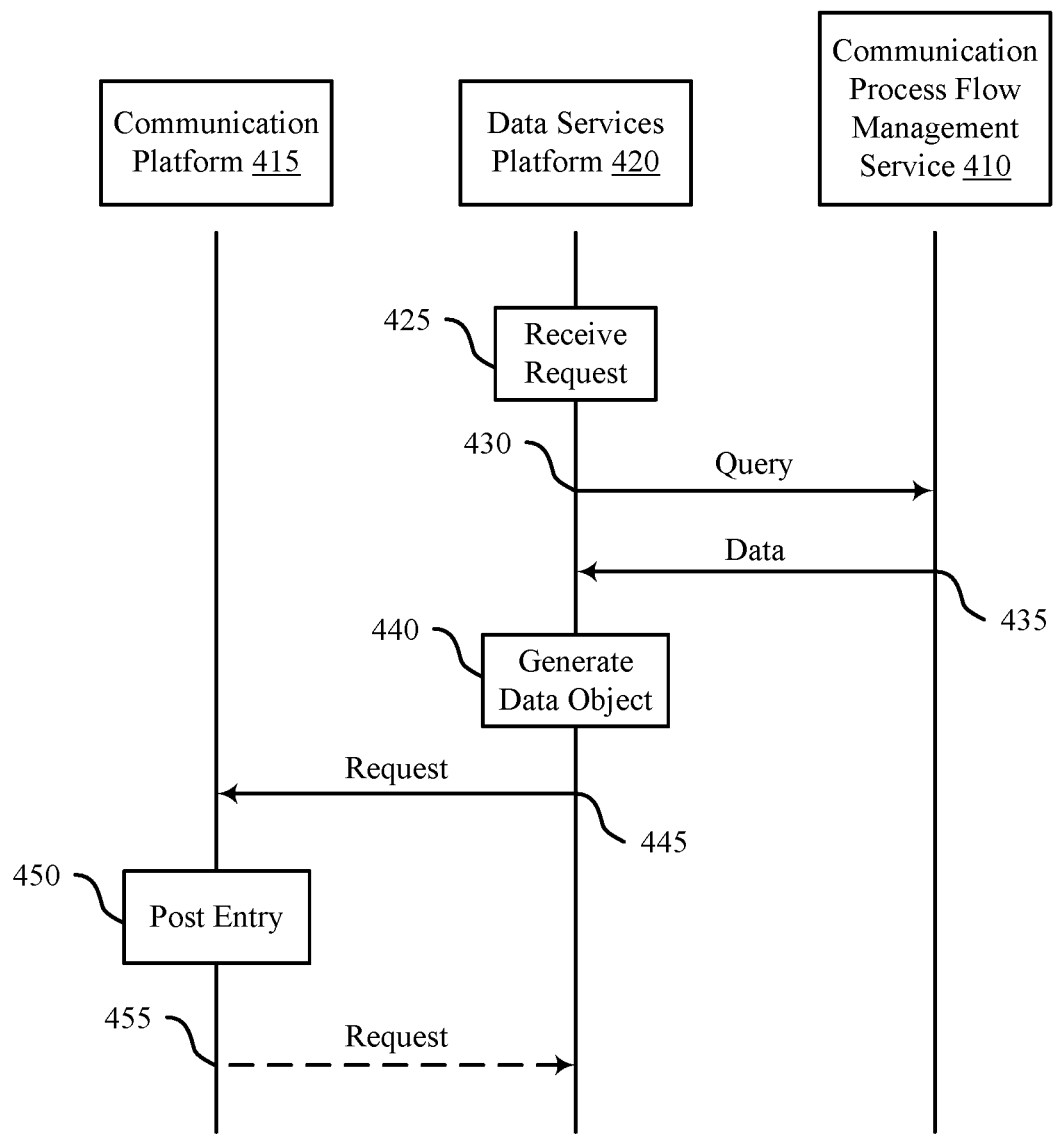
FIG. 4 illustrates an example of a process flow that supports techniques for cross-platform communication process flow metric generation and display in accordance with aspects of the present disclosure.

FIG. 4 illustrates an example of a process flow 400 that supports techniques for cross-platform communication process flow metric generation and display in accordance with aspects of the present disclosure. The process flow 400 may implement or be implemented by aspects of the data processing system 100, the computing architecture 200, or the data processing system 300. For example, the process flow 400 may include a communication process flow management service 410, a communication platform 415, and a data services platform 420, which may be examples of corresponding services and platforms described with reference to FIGS. 1 through 3. In the following description of the process flow 400, operations between the communication process flow management service 410, the communication platform 415, and the data services platform 420 may be performed in a different order or at a different time than as shown. Additionally or alternatively, some operations may be omitted from the process flow 400, and other operations may be added to the process flow 400. The process flow 400 may support techniques for improved cross-platform compatibility based on integrating the data services platform 420 with the communication process flow management service 410 and the communication platform 415.

At 425, the data services platform 420 may receive a first request for a data object associated with a communication process flow (e.g., a communication process flow 225 described with reference to FIG. 2). The data services platform 420 may receive the first request from a user (e.g., employee, administrator) associated with a tenant of a multi-tenant system. The user may transmit the first request via a UI associated with the data services platform 420 or a UI associated with the communication platform 415. The first request may include a set of querying parameters associated with the communication platform and a set of triggering parameters associated with the data object. The set of querying parameters may include a time duration associated with the communication process flow or a set of communication metrics related to the communication process flow, among other examples. The set of triggering parameters may include a scheduled time or a threshold for posting the data object into a communication channel of the communication platform. The set of triggering parameters may also include a frequency for generating the data object or a frequency for posting the data object into a communication channel of the communication platform.

At 430, the data services platform 420 may transmit a query to the communication process flow management service 410 in accordance with the querying parameters specified in the first request. For example, the data services platform 420 may query the communication process flow management service 410 for data (e.g., data related to the communication process flow) that corresponds to a time duration specified by the set of querying parameters. At 435, the data services platform 420 may receive data associated with the communication process flow based on querying the communication process flow management service 410. In some examples, the data services platform 420 may determine whether the communication process flow has satisfied a threshold (e.g., a threshold specified by the set of triggering parameters) based on the received data.

At 440, the data services platform 420 may generate the data object (e.g., a data object 250 described with reference to FIG. 2) associated with the communication process flow based on the data received from the communication process flow management service 410. In some examples, the data object may be configured as a JSON object that is compatible with (e.g., ingestible by) the communication platform 415. The data object may include a chart, a graph, or a visualization of the data associated with the communication process flow. For example, the data object may illustrate a set of communication metrics (e.g., open rate, click rate, unsubscribe rate) corresponding to the communication process flow. The data services platform 420 may generate the data object based on the set of triggering parameters specified in the first request. For example, the data services platform 420 may generate the data object at a scheduled time or in response to the communication platform satisfying a threshold specified by the set of triggering parameters.

At 445, the data services platform 420 may transmit a second request to the communication platform 415 in accordance with the set of triggering parameters. For example, the data services platform 420 may transmit the second request based on the data associated with the communication process flow (e.g., the data received in response to querying the communication process flow management service 410) satisfying a threshold specified by the set of triggering parameters. Alternatively, the data services platform 420 may transmit the second request with a frequency (e.g., hourly, daily, monthly) specified by the set of triggering parameters. At 450, the second request may cause posting of an entry of the data object into a communication channel of the communication platform 415. In some examples, the entry may include an indication of the data object. For example, the entry may include an image of the object or a link to the data object (e.g., a URL corresponding to the data services platform 420).

At 455, a user of the communication platform 415 may transmit a third request for additional information (e.g., data) related to the communication process flow. The user may transmit the third request in response to posting of the entry into the communication channel. In some examples, the user may request an additional set of communication metrics related to the communication process flow or a different data object associated with the communication process flow. Additionally or alternatively, the user may directly update or adjust a configuration of the communication process flow from within the communication channel of the communication platform 415 (e.g., by interacting with a UI or entering a command). If, for example, the entry includes a link to the data object, the user may interact with the link, which may trigger the third request. The data services platform 420 may perform various actions in response to the third request. For example, the data services platform may transmit an additional query to the communication process flow management service 410 or trigger display of a UI associated with the data services platform 420 (e.g., if the user clicks on the link to the data object).

The techniques described in the process flow 400 may enable users of the communication platform 415 to interact with data from the communication process flow management service 410 via the communication platform 415, which may improve the overall compatibility between the communication process flow management service 410 and the communication platform 415. For example, users of the communication platform 415 may modify or update aspects of a communication process flow from within the communication platform 415 instead of navigating to the communication process flow management service 410 and interacting with a UI associated with the communication process flow management service 410. As such, the techniques described in the process flow 400 may result in improved workflow efficiency, greater cross-platform compatibility, and higher user satisfaction, among other benefits.

Figure 5:
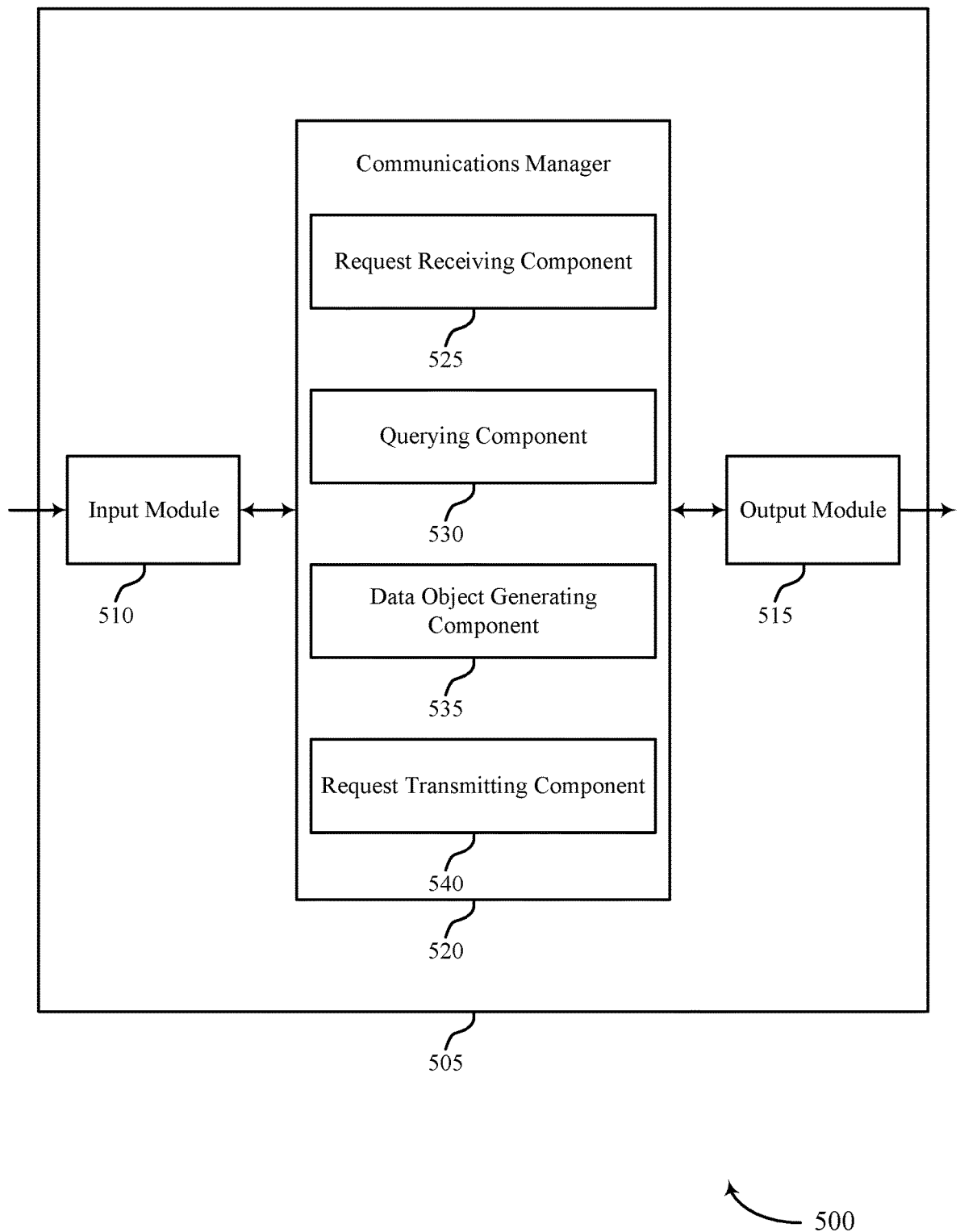
FIG. 5 shows a block diagram of an apparatus that supports techniques for cross-platform communication process flow metric generation and display in accordance with aspects of the present disclosure.

FIG. 5 shows a block diagram 500 of a device 505 that supports techniques for cross-platform communication process flow metric generation and display in accordance with aspects of the present disclosure. The device 505 may include an input module 510, an output module 515, and a communications manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 520 to support techniques for cross-platform communication process flow metric generation and display. In some cases, the input module 510 may be a component of an input/output (I/O) controller 710 as described with reference to FIG. 7.

The output module 515 may manage output signals for the device 505. For example, the output module 515 may receive signals from other components of the device 505, such as the communications manager 520, and may transmit these signals to other components or devices. In some examples, the output module 515 may transmit output signals for display in a UI, for storage in a database or data store, for further processing at a server or server cluster, or for any other processes at any number of devices or systems. In some cases, the output module 515 may be a component of an I/O controller 710 as described with reference to FIG. 7.

For example, the communications manager 520 may include a request receiving component 525, a querying component 530, a data object generating component 535, a request transmitting component 540, or any combination thereof. In some examples, the communications manager 520, or various components thereof, may be configured to perform various operations (e.g., receiving, monitoring, transmitting) using or otherwise in cooperation with the input module 510, the output module 515, or both. For example, the communications manager 520 may receive information from the input module 510, send information to the output module 515, or be integrated in combination with the input module 510, the output module 515, or both to receive information, transmit information, or perform various other operations as described herein.

The communications manager 520 may support data processing in accordance with examples as disclosed herein. The request receiving component 525 may be configured as or otherwise support a means for receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The querying component 530 may be configured as or otherwise support a means for querying, based on the set of querying parameters, a communication process flow management service for data associated with the communication process flow. The data object generating component 535 may be configured as or otherwise support a means for generating the data object based on querying the communication process flow management service, the data object including the data associated with the communication process flow. The request transmitting component 540 may be configured as or otherwise support a means for transmitting, to a communication platform in accordance with the set of triggering parameters, a second request that includes the data object, where the second request is configured to cause posting of an entry of the data object into a communication channel of the communication platform that is associated with the tenant.

Figure 6:
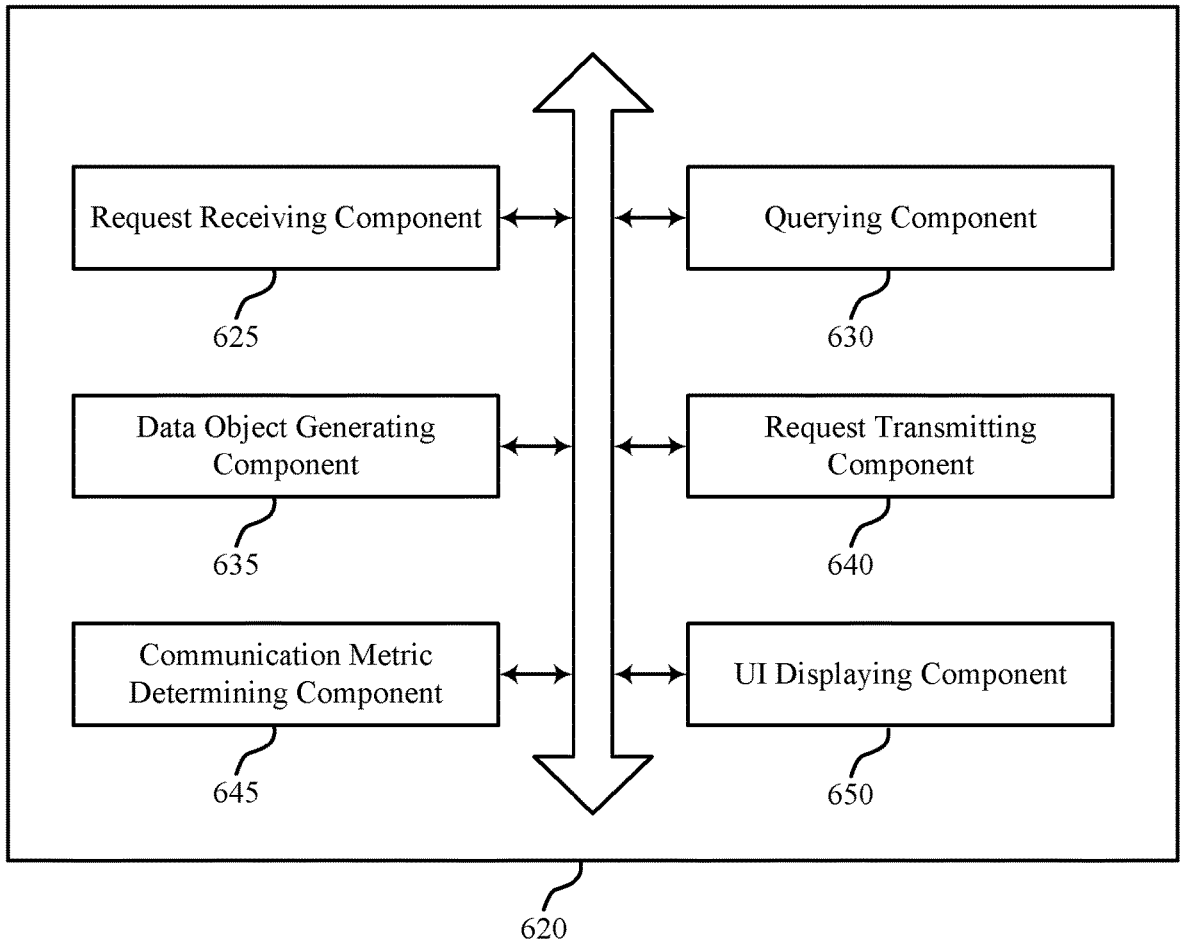
FIG. 6 shows a block diagram of a communications manager that supports techniques for cross-platform communication process flow metric generation and display in accordance with aspects of the present disclosure.

FIG. 6 shows a block diagram 600 of a communications manager 620 that supports techniques for cross-platform communication process flow metric generation and display in accordance with aspects of the present disclosure. The communications manager 620 may be an example of aspects of a communications manager or a communications manager 520, or both, as described herein. The communications manager 620, or various components thereof, may be an example of means for performing various aspects of techniques for cross-platform communication process flow metric generation and display as described herein. For example, the communications manager 620 may include a request receiving component 625, a querying component 630, a data object generating component 635, a request transmitting component 640, a communication metric determining component 645, a UI displaying component 650, or any combination thereof. Each of these components may communicate, directly or indirectly, with one another (e.g., via one or more buses).

The communications manager 620 may support data processing in accordance with examples as disclosed herein. The request receiving component 625 may be configured as or otherwise support a means for receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The querying component 630 may be configured as or otherwise support a means for querying, based on the set of querying parameters, a communication process flow management service for data associated with the communication process flow. The data object generating component 635 may be configured as or otherwise support a means for generating the data object based on querying the communication process flow management service, the data object including the data associated with the communication process flow. The request transmitting component 640 may be configured as or otherwise support a means for transmitting, to a communication platform in accordance with the set of triggering parameters, a second request that includes the data object, where the second request is configured to cause posting of an entry of the data object into a communication channel of the communication platform that is associated with the tenant.

In some examples, to support transmitting the second request, the request transmitting component 640 may be configured as or otherwise support a means for transmitting the second request to the communication platform based on a scheduled time indicated by the set of triggering parameters.

In some examples, the data object generating component 635 may be configured as or otherwise support a means for identifying that the data associated with the communication process flow satisfies the set of triggering parameters, where generating the data object and transmitting the second request are based on identifying that the data satisfies the set of triggering parameters. In some examples, the set of triggering parameters specify a threshold associated with posting the entry into the communication channel. In some examples, the set of triggering parameters specifies a frequency for determining whether the data satisfies the threshold.

In some examples, to support generating the data object, the data object generating component 635 may be configured as or otherwise support a means for generating the data object based on the data satisfying the threshold during a time duration indicated by the set of triggering parameters.

In some examples, to support querying the communication process flow management service, the querying component 630 may be configured as or otherwise support a means for querying for the data associated with the communication process flow in accordance with the set of querying parameters.

In some examples, the communication metric determining component 645 may be configured as or otherwise support a means for determining one or more communication metrics based on the data associated with the communication process flow, where the data object includes the one or more communication metrics. In some examples, the one or more communication metrics comprise an open rate, a click rate, an unsubscribe rate, or a combination thereof.

In some examples, the data object generating component 635 may be configured as or otherwise support a means for generating a chart or graph that displays the data associated with the communication process flow, where the data object includes an indication of the chart or graph. In some examples, the indication of the chart or graph includes an image of the chart or graph, a link to the chart or graph, or both.

In some examples, to support receiving the first request, the request receiving component 625 may be configured as or otherwise support a means for receiving, from the communication platform, the first request for the data associated with the communication process flow, where querying the communication process flow management service, generating the data object, and transmitting the second request are based on receiving the first request.

In some examples, the request receiving component 625 may be configured as or otherwise support a means for receiving, from the communication platform in response to transmitting the second request, a third request for additional data associated with the communication process flow, where the third request indicates a modified set of querying parameters. In some examples, the querying component 630 may be configured as or otherwise support a means for querying, based on the modified set of querying parameters, the communication process flow management service for the additional data associated with the communication process flow. In some examples, the data object generating component 635 may be configured as or otherwise support a means for generating a second data object including the additional data associated with the communication process flow. In some examples, the request transmitting component 640 may be configured as or otherwise support a means for transmitting a fourth request to the communication platform that includes the second data object.

In some examples, the request receiving component 625 may be configured as or otherwise support a means for receiving, from the communication platform and in response to transmitting the second request, a third request to display a UI associated with the data object.

In some examples, the UI displaying component 650 may be configured as or otherwise support a means for displaying, based on receiving the third request, the UI associated with the data object, where the UI includes an indication of the data object.

In some examples, to support generating the data object, the data object generating component 635 may be configured as or otherwise support a means for generating a JSON object that is ingestible by the communication platform for posting the entry into the communication channel.

Figure 7:
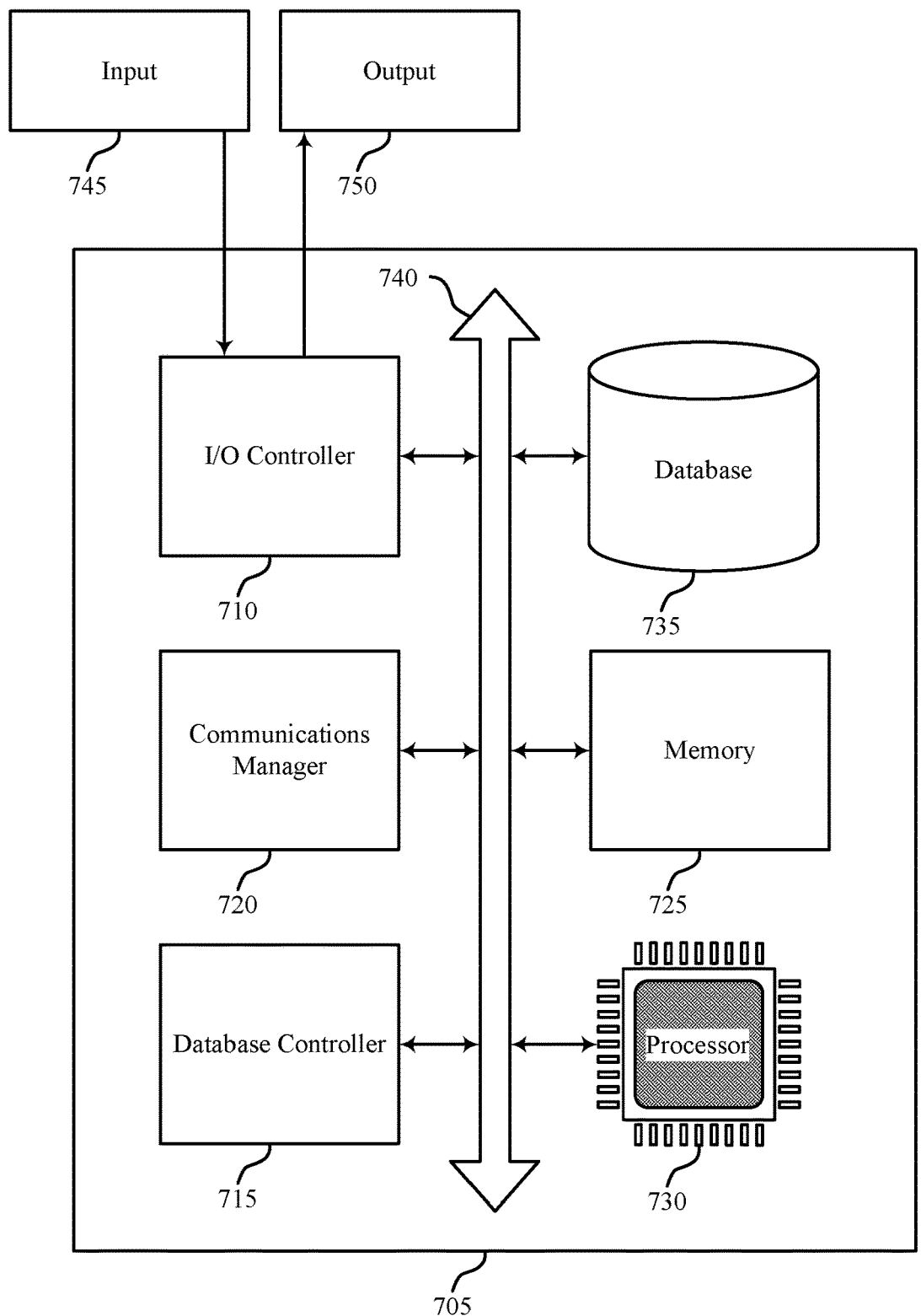
FIG. 7 shows a diagram of a system including a device that supports techniques for cross-platform communication process flow metric generation and display in accordance with aspects of the present disclosure.

FIG. 7 shows a diagram of a system 700 including a device 705 that supports techniques for cross-platform communication process flow metric generation and display in accordance with aspects of the present disclosure. The device 705 may be an example of or include the components of a device 505 as described herein. The device 705 may include components for data communications including components for transmitting and receiving communications, such as a communications manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS), which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for cross-platform communication process flow metric generation and display).

The communications manager 720 may support data processing in accordance with examples as disclosed herein. For example, the communications manager 720 may be configured as or otherwise support a means for receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The communications manager 720 may be configured as or otherwise support a means for querying, based on the set of querying parameters, a communication process flow management service for data associated with the communication process flow. The communications manager 720 may be configured as or otherwise support a means for generating the data object based on querying the communication process flow management service, the data object including the data associated with the communication process flow. The communications manager 720 may be configured as or otherwise support a means for transmitting, to a communication platform in accordance with the set of triggering parameters, a second request that includes the data object, where the second request is configured to cause posting of an entry of the data object into a communication channel of the communication platform that is associated with the tenant.

By including or configuring the communications manager 720 in accordance with examples as described herein, the device 705 may support techniques for improved workflow efficiencies and reduced communication resource overhead by enabling cross-platform compatibility between a communication process flow management service and a communication platform. For example, the described techniques may enable a user to post or otherwise display data objects (e.g., graphs, charts, diagrams) from the communication process flow management service in a communication channel of the communication platform, which may result in higher user satisfaction and improved workflow efficiency, among other benefits.

Figure 8:
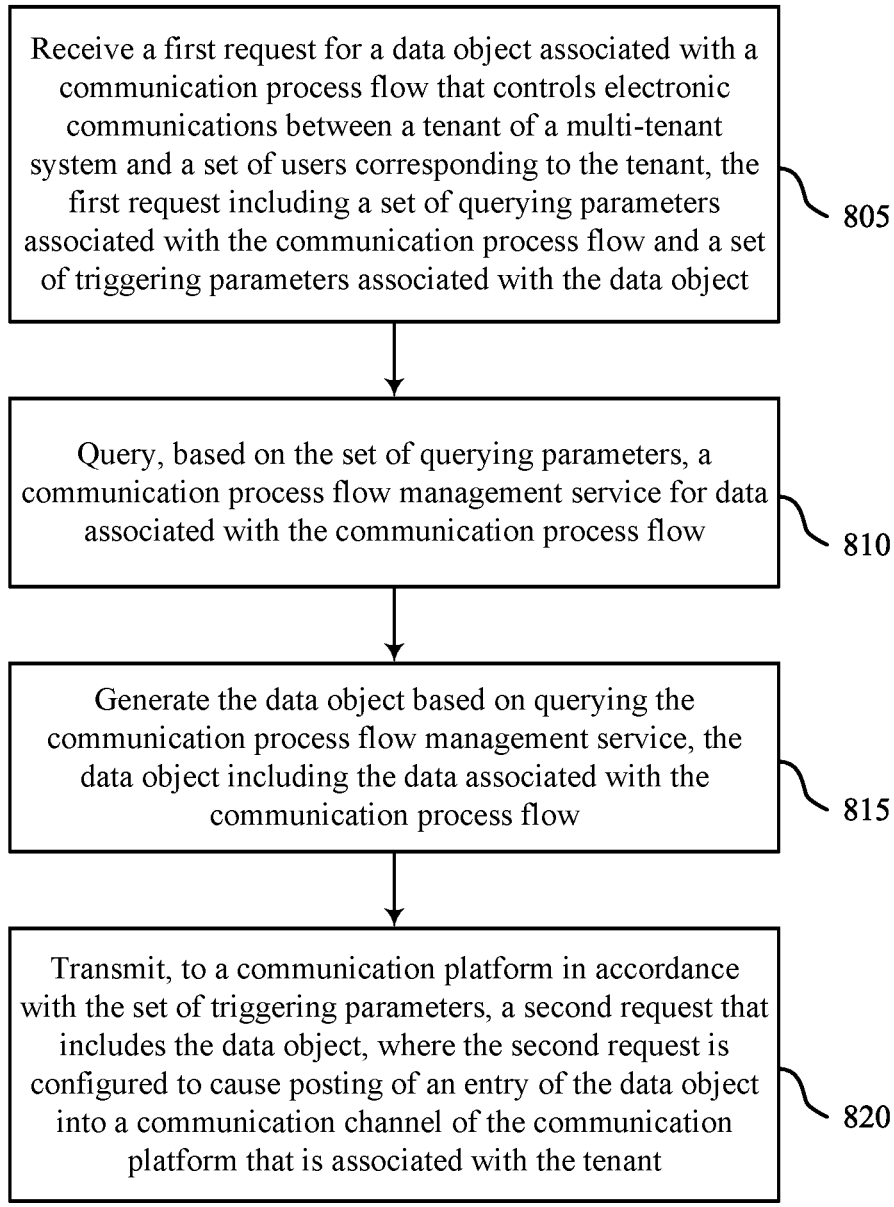
FIGS. 8 through 11 show flowcharts illustrating methods that support techniques for cross-platform communication process flow metric generation and display in accordance with aspects of the present disclosure.

FIG. 8 shows a flowchart illustrating a method 800 that supports techniques for cross-platform communication process flow metric generation and display in accordance with aspects of the present disclosure. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 805, the method may include receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The operations of 805 may be performed in accordance with examples as disclosed herein. In some examples, aspects of the operations of 805 may be performed by a request receiving component 625 as described with reference to FIG. 6.

At 810, the method may include querying, based on the set of querying parameters, a communication process flow management service for data associated with the communication process flow. The operations of 810 may be performed in accordance with examples as disclosed herein. In some examples, aspects of the operations of 810 may be performed by a querying component 630 as described with reference to FIG. 6.

At 815, the method may include generating the data object based on querying the communication process flow management service, the data object including the data associated with the communication process flow. The operations of 815 may be performed in accordance with examples as disclosed herein. In some examples, aspects of the operations of 815 may be performed by a data object generating component 635 as described with reference to FIG. 6.

At 820, the method may include transmitting, to a communication platform in accordance with the set of triggering parameters, a second request that includes the data object, where the second request is configured to cause posting of an entry of the data object into a communication channel of the communication platform that is associated with the tenant. The operations of 820 may be performed in accordance with examples as disclosed herein. In some examples, aspects of the operations of 820 may be performed by a request transmitting component 640 as described with reference to FIG. 6.

Figure 9:
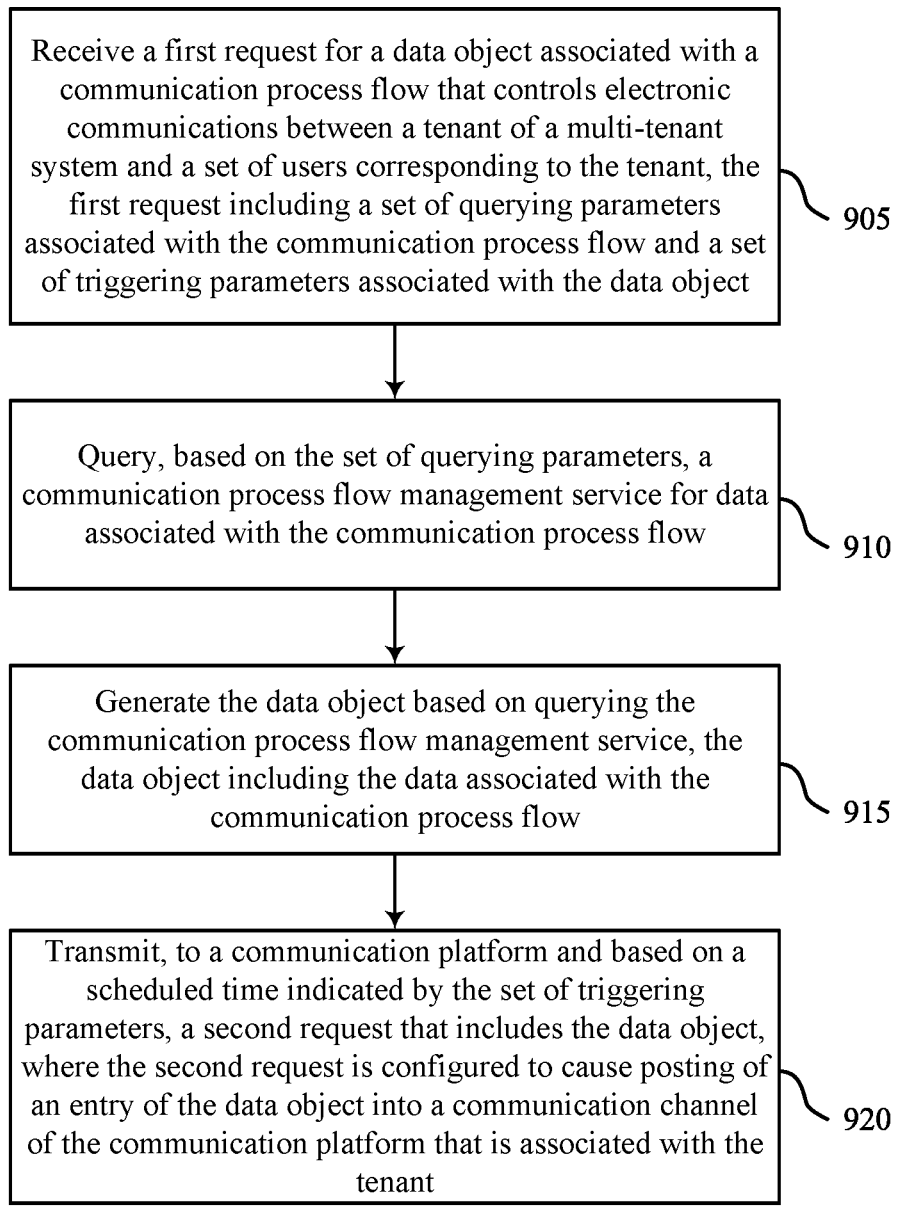

FIG. 9 shows a flowchart illustrating a method 900 that supports techniques for cross-platform communication process flow metric generation and display in accordance with aspects of the present disclosure. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 905, the method may include receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The operations of 905 may be performed in accordance with examples as disclosed herein. In some examples, aspects of the operations of 905 may be performed by a request receiving component 625 as described with reference to FIG. 6.

At 910, the method may include querying, based on the set of querying parameters, a communication process flow management service for data associated with the communication process flow. The operations of 910 may be performed in accordance with examples as disclosed herein. In some examples, aspects of the operations of 910 may be performed by a querying component 630 as described with reference to FIG. 6.

At 915, the method may include generating the data object based on querying the communication process flow management service, the data object including the data associated with the communication process flow. The operations of 915 may be performed in accordance with examples as disclosed herein. In some examples, aspects of the operations of 915 may be performed by a data object generating component 635 as described with reference to FIG. 6.

At 920, the method may include transmitting, to a communication platform and based on a scheduled time indicated by the set of triggering parameters, a second request that includes the data object, where the second request is configured to cause posting of an entry of the data object into a communication channel of the communication platform that is associated with the tenant. The operations of 920 may be performed in accordance with examples as disclosed herein. In some examples, aspects of the operations of 920 may be performed by a request transmitting component 640 as described with reference to FIG. 6.

Figure 10:
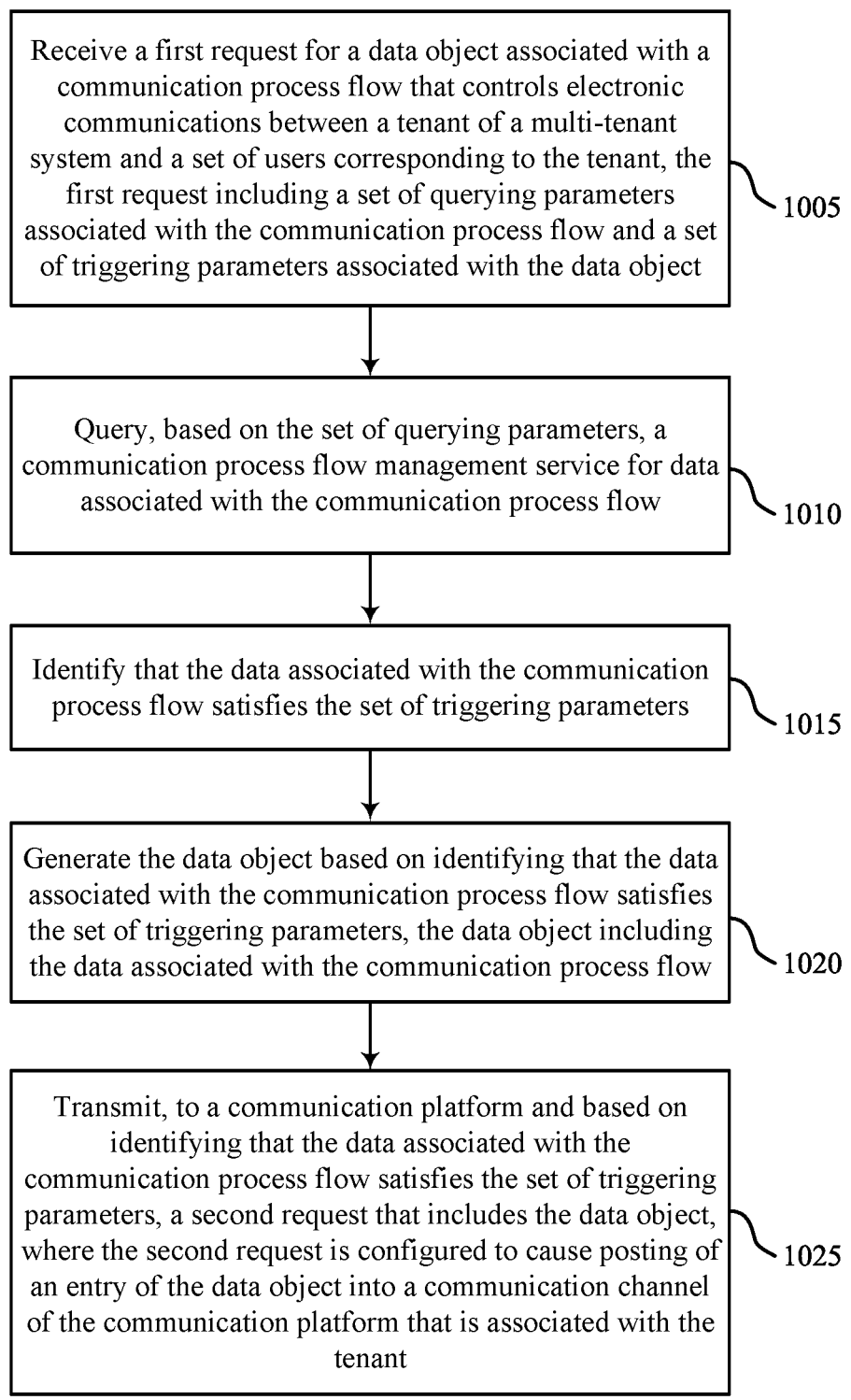

FIG. 10 shows a flowchart illustrating a method 1000 that supports techniques for cross-platform communication process flow metric generation and display in accordance with aspects of the present disclosure. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 1005, the method may include receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The operations of 1005 may be performed in accordance with examples as disclosed herein. In some examples, aspects of the operations of 1005 may be performed by a request receiving component 625 as described with reference to FIG. 6.

At 1010, the method may include querying, based on the set of querying parameters, a communication process flow management service for data associated with the communication process flow. The operations of 1010 may be performed in accordance with examples as disclosed herein. In some examples, aspects of the operations of 1010 may be performed by a querying component 630 as described with reference to FIG. 6.

At 1015, the method may include identifying that the data associated with the communication process flow satisfies the set of triggering parameters. The operations of 1015 may be performed in accordance with examples as disclosed herein. In some examples, aspects of the operations of 1015 may be performed by a data object generating component 635 as described with reference to FIG. 6.

At 1020, the method may include generating the data object based on identifying that the data associated with the communication process flow satisfies the set of triggering parameters, the data object including the data associated with the communication process flow. The operations of 1020 may be performed in accordance with examples as disclosed herein. In some examples, aspects of the operations of 1020 may be performed by a data object generating component 635 as described with reference to FIG. 6.

At 1025, the method may include transmitting, to a communication platform and based on identifying that the data associated with the communication process flow satisfies the set of triggering parameters, a second request that includes the data object, where the second request is configured to cause posting of an entry of the data object into a communication channel of the communication platform that is associated with the tenant. The operations of 1025 may be performed in accordance with examples as disclosed herein. In some examples, aspects of the operations of 1025 may be performed by a request transmitting component 640 as described with reference to FIG. 6.

Figure 11:
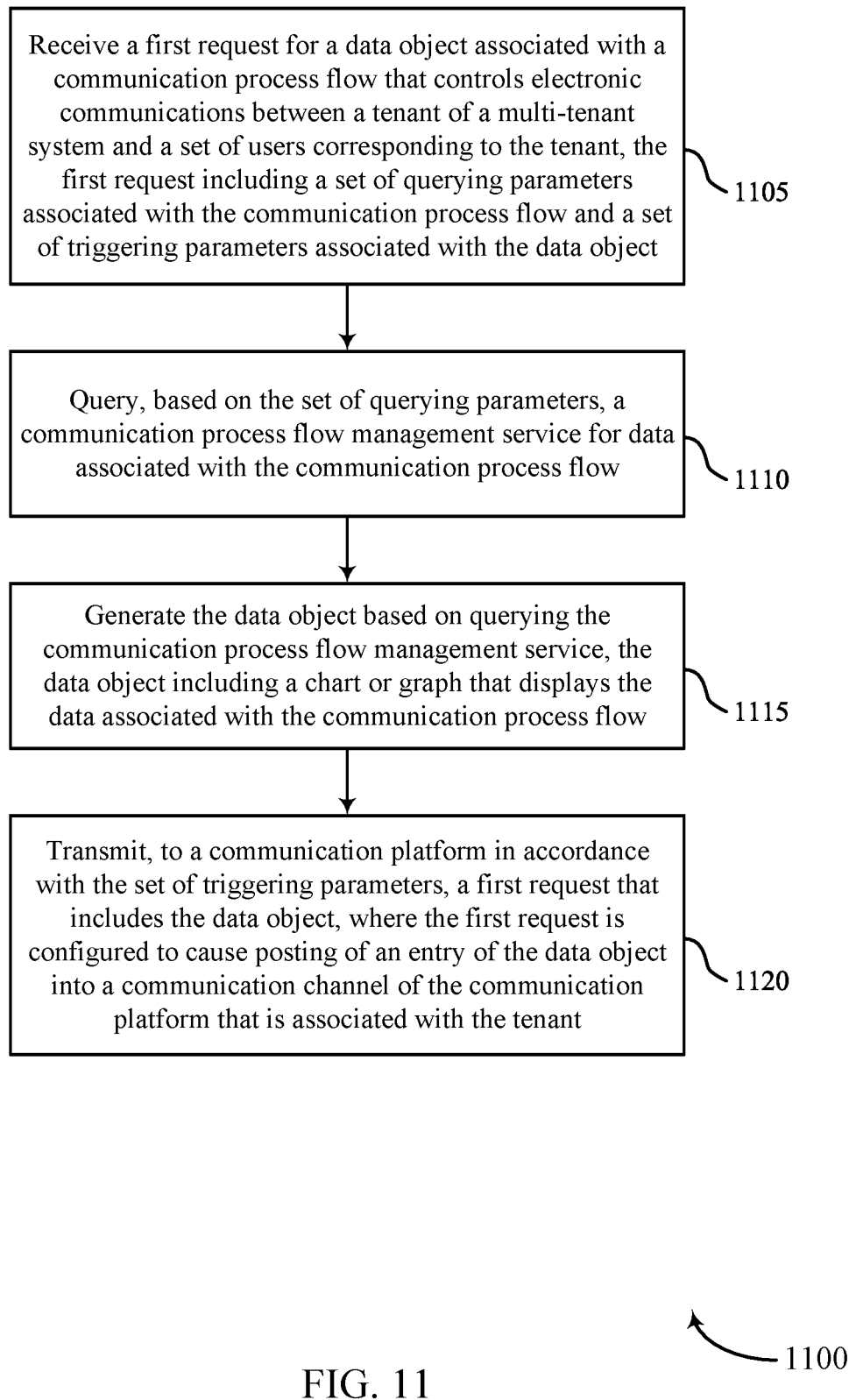

FIG. 11 shows a flowchart illustrating a method 1100 that supports techniques for cross-platform communication process flow metric generation and display in accordance with aspects of the present disclosure. The operations of the method 1100 may be implemented by an application server or its components as described herein. For example, the operations of the method 1100 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 1105, the method may include receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object. The operations of 1105 may be performed in accordance with examples as disclosed herein. In some examples, aspects of the operations of 1105 may be performed by a request receiving component 625 as described with reference to FIG. 6.

At 1110, the method may include querying, based on the set of querying parameters, a communication process flow management service for data associated with the communication process flow. The operations of 1110 may be performed in accordance with examples as disclosed herein. In some examples, aspects of the operations of 1110 may be performed by a querying component 630 as described with reference to FIG. 6.

At 1115, the method may include generating the data object based on querying the communication process flow management service, the data object including an indication of a chart or graph that displays the data associated with the communication process flow. The operations of 1115 may be performed in accordance with examples as disclosed herein. In some examples, aspects of the operations of 1115 may be performed by a data object generating component 635 as described with reference to FIG. 6.

At 1120, the method may include transmitting, to a communication platform in accordance with the set of triggering parameters, a second request that includes the data object, where the second request is configured to cause posting of an entry of the data object into a communication channel of the communication platform that is associated with the tenant. The operations of 1120 may be performed in accordance with examples as disclosed herein. In some examples, aspects of the operations of 1120 may be performed by a request transmitting component 640 as described with reference to FIG. 6.

A method for data processing is described. The method may include receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object, querying, based on the set of querying parameters, a communication process flow management service for data associated with the communication process flow, generating the data object based on querying the communication process flow management service, the data object including the data associated with the communication process flow, and transmitting, to a communication platform in accordance with the set of triggering parameters, a second request that includes the data object, where the second request is configured to cause posting of an entry of the data object into a communication channel of the communication platform that is associated with the tenant.

An apparatus for data processing is described. The apparatus may include a processor, memory coupled with the processor, and instructions stored in the memory. The instructions may be executable by the processor to cause the apparatus to receive a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object, query, based on the set of querying parameters, a communication process flow management service for data associated with the communication process flow, generate the data object based on querying the communication process flow management service, the data object including the data associated with the communication process flow, and transmit, to a communication platform in accordance with the set of triggering parameters, a second request that includes the data object, where the second request is configured to cause posting of an entry of the data object into a communication channel of the communication platform that is associated with the tenant.

Another apparatus for data processing is described. The apparatus may include means for receiving a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object, means for querying, based on the set of querying parameters, a communication process flow management service for data associated with the communication process flow, means for generating the data object based on querying the communication process flow management service, the data object including the data associated with the communication process flow, and means for transmitting, to a communication platform in accordance with the set of triggering parameters, a second request that includes the data object, where the second request is configured to cause posting of an entry of the data object into a communication channel of the communication platform that is associated with the tenant.

A non-transitory computer-readable medium storing code for data processing is described. The code may include instructions executable by a processor to receive a first request for a data object associated with a communication process flow that controls electronic communications between a tenant of a multi-tenant system and a set of users corresponding to the tenant, the first request including a set of querying parameters associated with the communication process flow and a set of triggering parameters associated with the data object, query, based on the set of querying parameters, a communication process flow management service for data associated with the communication process flow, generate the data object based on querying the communication process flow management service, the data object including the data associated with the communication process flow, and transmit, to a communication platform in accordance with the set of triggering parameters, a second request that includes the data object, where the second request is configured to cause posting of an entry of the data object into a communication channel of the communication platform that is associated with the tenant.

In some examples of the method, apparatuses, and non-transitory computer-readable medium described herein, transmitting the second request may include operations, features, means, or instructions for transmitting the second request to the communication platform based on a scheduled time indicated by the set of triggering parameters.

Some examples of the method, apparatuses, and non-transitory computer-readable medium described herein may further include operations, features, means, or instructions for identifying that the data associated with the communication process flow satisfies the set of triggering parameters, where generating the data object and transmitting the second request may be based on identifying that the data satisfies the set of triggering parameters.

In some examples of the method, apparatuses, and non-transitory computer-readable medium described herein, the set of triggering parameters specify a threshold associated with posting the entry into the communication channel.

In some examples of the method, apparatuses, and non-transitory computer-readable medium described herein, generating the data object may include operations, features, means, or instructions for generating the data object based on the data satisfying the threshold during a time duration indicated by the set of triggering parameters.

In some examples of the method, apparatuses, and non-transitory computer-readable medium described herein, the set of triggering parameters specifies a frequency for determining whether the data satisfies the threshold.

In some examples of the method, apparatuses, and non-transitory computer-readable medium described herein, querying the communication process flow management service may include operations, features, means, or instructions for querying for the data associated with the communication process flow in accordance with the set of querying parameters.

Some examples of the method, apparatuses, and non-transitory computer-readable medium described herein may further include operations, features, means, or instructions for determining one or more communication metrics based on the data associated with the communication process flow, where the data object includes the one or more communication metrics.

In some examples of the method, apparatuses, and non-transitory computer-readable medium described herein, the one or more communication metrics comprise an open rate, a click rate, an unsubscribe rate, or a combination thereof.

Some examples of the method, apparatuses, and non-transitory computer-readable medium described herein may further include operations, features, means, or instructions for generating a chart or graph that displays the data associated with the communication process flow, where the data object includes an indication of the chart or graph.

In some examples of the method, apparatuses, and non-transitory computer-readable medium described herein, the indication of the chart or graph includes an image of the chart or graph, a link to the chart or graph, or both.

In some examples of the method, apparatuses, and non-transitory computer-readable medium described herein, receiving the first request may include operations, features, means, or instructions for receiving, from the communication platform, the first request for the data associated with the communication process flow, where querying the communication process flow management service, generating the data object, and transmitting the request may be based on receiving the first request.

Some examples of the method, apparatuses, and non-transitory computer-readable medium described herein may further include operations, features, means, or instructions for receiving, from the communication platform in response to transmitting the second request, a third request for additional data associated with the communication process flow, where the third request indicates a modified set of querying parameters, querying, based on the modified set of querying parameters, the communication process flow management service for the additional data associated with the communication process flow, generating a second data object including the additional data associated with the communication process flow, and transmitting a fourth request to the communication platform that includes the second data object.

In some examples of the method, apparatuses, and non-transitory computer-readable medium described herein, generating the data object may include operations, features, means, or instructions for generating a JSON object that may be ingestible by the communication platform for posting the entry into the communication channel.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, by a data services platform associated with a communication process flow management service and from a first communication channel of a group-based communication platform associated with communications between a first group of users of a plurality of users of the group-based communication platform that comprises a plurality of chat service based communication channels associated with communications between respective groups of users of the plurality of users, a first request triggered by a user from the first group of users associated with the first communication channel of the group-based communication platform, the first request comprising a set of querying parameters to use for retrieving data associated with a communication process flow that controls electronic communications between a tenant of a multi-tenant system and a set of users corresponding to the tenant, the first request further comprising a set of triggering parameters to use for generating a data object associated with the communication process flow;
   querying the communication process flow management service for the data associated with the communication process flow in accordance with the set of querying parameters from the first request, wherein the communication process flow management service tracks engagement metrics between the tenant of the multi-tenant system and the set of users corresponding to the tenant, wherein the communication process flow management service supports management and deployment of communication process flows within the multi-tenant system, and wherein the data associated with the communication process flow comprises at least one engagement metric that specifies an engagement rate at which one or more users engage with the electronic communications controlled by the communication process flow;
   generating the data object that is configured to be posted in the group-based communication platform in accordance with the set of triggering parameters from the first request, the data object comprising the data associated with the communication process flow, wherein the data object is configured to display an indication of the at least one engagement metric associated with the communication process flow in the first communication channel of the group-based communication platform that is separate from the communication process flow from which the at least one engagement metric is obtained; and
   transmitting, from the communication process flow management service to the group-based communication platform, a second request that is configured to cause posting of the data object into the first communication channel of the group-based communication platform via which the first request was triggered by the user.

2. The method of claim 1, wherein transmitting the second request comprises:
   transmitting the second request to the group-based communication platform based at least in part on a scheduled time indicated by the set of triggering parameters.

3. The method of claim 1, further comprising:
   identifying that the data associated with the communication process flow satisfies the set of triggering parameters, wherein generating the data object and transmitting the second request are based at least in part on identifying that the data satisfies the set of triggering parameters.

4. The method of claim 3, wherein the set of triggering parameters specifies a threshold associated with posting the data object into the first communication channel of the group-based communication platform, a frequency for determining whether the data associated with the communication process flow satisfies the threshold, or both.

5. The method of claim 4, wherein generating the data object comprises:
generating the data object based at least in part on the data satisfying the threshold during a time duration indicated by the set of triggering parameters.

6. The method of claim 1, wherein querying the communication process flow management service comprises:
querying for the data associated with the communication process flow in accordance with the set of querying parameters.

7. The method of claim 1, further comprising:
determining one or more engagement metrics based at least in part on the data associated with the communication process flow, wherein the data object comprises the one or more engagement metrics.

8. The method of claim 7, wherein the engagement rate specified by the at least one engagement metric is an open rate, a click rate, an unsubscribe rate, or a combination thereof.

9. The method of claim 1, further comprising:
generating a chart or graph that displays the data associated with the communication process flow in the first communication channel of the group-based communication platform, wherein the indication of the at least one engagement metric associated with the communication process flow of the data object comprises an indication of the chart or graph.

10. The method of claim 9, wherein the indication of the chart or graph comprises an image of the chart or graph, a link to the chart or graph, or both.

11. The method of claim 1, wherein receiving the first request comprises:
receiving, from the group-based communication platform, the first request for the data associated with the communication process flow, wherein querying the communication process flow management service, generating the data object, and transmitting the second request are based at least in part on receiving the first request.

12. The method of claim 1, further comprising:
receiving, from the group-based communication platform in response to transmitting the second request, a third request for additional data associated with the communication process flow, wherein the third request indicates a modified set of querying parameters;
querying, based at least in part on the modified set of querying parameters, the communication process flow management service for the additional data associated with the communication process flow;
generating a second data object comprising the additional data associated with the communication process flow; and
transmitting a fourth request to the group-based communication platform that comprises the second data object.

13. The method of claim 1, wherein generating the data object comprises:
generating a JavaScript object notation (JSON) object that is ingestible by the group-based communication platform for posting into the first communication channel.

14. The method of claim 1, further comprising:
receiving, from the group-based communication platform and in response to transmitting the second request, a third request to display a user interface associated with the data object in the first communication channel of the group-based communication platform; and
displaying, based at least in part on receiving the third request, the user interface associated with the data object in the first communication channel of the group-based communication platform, wherein the user interface comprises an indication of the data object.

15. An apparatus for data processing, comprising:
at least one processor;
at least one memory coupled with the at least one processor; and
instructions stored in the at least one memory and executable by the at least one processor to cause the apparatus to:
receive, by a data services platform associated with a communication process flow management service and from a first communication channel of a group-based communication platform associated with communications between a first group of users of a plurality of users of the group-based communication platform that comprises a plurality of chat service based communication channels associated with communications between respective groups of users of the plurality of users, a first request triggered by a user from the first group of users associated with the first communication channel of the group-based communication platform, the first request comprising a set of querying parameters to use for retrieving data associated with a communication process flow that controls electronic communications between a tenant of a multi-tenant system and a set of users corresponding to the tenant, the first request further comprising a set of triggering parameters to use for generating a data object associated with the communication process flow;
query the communication process flow management service for the data associated with the communication process flow in accordance with the set of querying parameters from the first request, wherein the communication process flow management service tracks engagement metrics between the tenant of the multi-tenant system and the set of users corresponding to the tenant, wherein the communication process flow management service supports management and deployment of communication process flows within the multi-tenant system, and wherein the data associated with the communication process flow comprises at least one engagement metric that specifies an engagement rate at which one or more users engage with the electronic communications controlled by the communication process flow;
generate the data object that is configured to be posted in the group-based communication platform in accordance with the set of triggering parameters from the first request, the data object comprising the data associated with the communication process flow, wherein the data object is configured to display an indication of the at least one engagement metric associated with the communication process flow in the first communication channel of the group-based communication platform that is separate from the communication process flow from which the at least one engagement metric is obtained; and
transmit, from the communication process flow management service to the group-based communication platform, a second request that is configured to cause posting of the data object into the first communication channel of the group-based communication platform via which the first request was triggered by the user.

16. The apparatus of claim 15, wherein to transmit the second request, the instructions are executable by the at least one processor to cause the apparatus to:

transmit the second request to the group-based communication platform based at least in part on a scheduled time indicated by the set of triggering parameters.

17. The apparatus of claim 15, wherein the instructions are further executable by the at least one processor to cause the apparatus to:
identify that the data associated with the communication process flow satisfies the set of triggering parameters, wherein generating the data object and transmitting the second request are based at least in part on identifying that the data satisfies the set of triggering parameters.

18. The apparatus of claim 15, wherein the instructions are further executable by the at least one processor to cause the apparatus to:
determine one or more engagement metrics based at least in part on the data associated with the communication process flow, wherein the data object comprises the one or more engagement metrics.

19. The apparatus of claim 15, wherein the instructions are further executable by the at least one processor to cause the apparatus to:
receive, from the group-based communication platform in response to transmitting the second request, a third request for additional data associated with the communication process flow, wherein the third request indicates a modified set of querying parameters;
query, based at least in part on the modified set of querying parameters, the communication process flow management service for the additional data associated with the communication process flow;
generate a second data object comprising the additional data associated with the communication process flow; and
transmit a fourth request to the group-based communication platform that comprises the second data object.

20. A non-transitory computer-readable medium storing code for data processing, the code comprising instructions executable by at least one processor to:
receive, by a data services platform associated with a communication process flow management service and from a first communication channel of a group-based communication platform associated with communications between a first group of users of a plurality of users of the group-based communication platform that comprises a plurality of chat service based communication channels associated with communications between respective groups of users of the plurality of users, a first request triggered by a user from the first group of users associated with the first communication channel of the group-based communication platform, the first request comprising a set of querying parameters to use for retrieving data associated with a communication process flow that controls electronic communications between a tenant of a multi-tenant system and a set of users corresponding to the tenant, the first request further comprising a set of triggering parameters to use for generating a data object associated with the communication process flow;
query the communication process flow management service for the data associated with the communication process flow in accordance with the set of querying parameters from the first request, wherein the communication process flow management service tracks engagement metrics between the tenant of the multi-tenant system and the set of users corresponding to the tenant, wherein the communication process flow management service supports management and deployment of communication process flows within the multi-tenant system, and wherein the data associated with the communication process flow comprises at least one engagement metric that specifies an engagement rate at which one or more users engage with the electronic communications controlled by the communication process flow;
generate the data object that is configured to be posted in the group-based communication platform in accordance with the set of triggering parameters from the first request, the data object comprising the data associated with the communication process flow, wherein the data object is configured to display an indication of the at least one engagement metric associated with the communication process flow in the first communication channel of the group-based communication platform that is separate from the communication process flow from which the at least one engagement metric is obtained; and
transmit, from the communication process flow management service to the group-based communication platform, a second request that is configured to cause posting of the data object into the first communication channel of the group-based communication platform via which the first request was triggered by the user.

* * * * *